United States Patent
Kimura et al.

(10) Patent No.: US 6,898,527 B2
(45) Date of Patent: May 24, 2005

(54) PARKING ASSISTING DEVICE

(75) Inventors: Tomio Kimura, Aichi-ken (JP);
Kazunori Shimazaki, Aichi-ken (JP);
Satoshi Yamada, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/183,734

(22) Filed: Jun. 27, 2002

(65) Prior Publication Data

US 2003/0004617 A1 Jan. 2, 2003

(30) Foreign Application Priority Data

Jun. 29, 2001 (JP) .......................... 2001-199021
Dec. 28, 2001 (JP) .......................... 2001-399992

(51) Int. Cl.$^7$ .............................. G06F 19/00; B60Q 1/48
(52) U.S. Cl. .............................. 701/301; 340/436
(58) Field of Search .............................. 701/1, 23, 211, 701/301; 340/436; 180/167, 168, 169

(56) References Cited

U.S. PATENT DOCUMENTS

| | | | | |
|---|---|---|---|---|
| 5,754,123 A | * | 5/1998 | Nashif et al. | 340/903 |
| 6,021,373 A | * | 2/2000 | Zuercher et al. | 701/300 |
| 6,061,002 A | * | 5/2000 | Weber et al. | 340/932.2 |
| 6,173,229 B1 | * | 1/2001 | Fennel et al. | 701/91 |
| 6,483,442 B2 | * | 11/2002 | Shimizu et al. | 340/932.2 |
| 6,683,539 B2 | * | 1/2004 | Trajkovic et al. | 340/932.2 |
| 2003/0122687 A1 | * | 7/2003 | Trajkovic et al. | 340/932.2 |

FOREIGN PATENT DOCUMENTS

| | | | |
|---|---|---|---|
| JP | Hei 04-30300 | 2/1992 | ............ G08G/1/16 |
| JP | 06-028598 | 2/1994 | |
| JP | 11-157404 | 6/1999 | |
| WO | WO 01/12472 A1 | 2/2001 | ............ B60R/21/00 |

* cited by examiner

Primary Examiner—Michael J. Zanelli
(74) Attorney, Agent, or Firm—Morgan & Finnegan, LLP

(57) ABSTRACT

When a vehicle advances in parallel with a parking frame to reach an initial stop position, measurement of a distance to a parked vehicle is continuously performed by means of an ultrasonic sensor and a moving distance of the vehicle is simultaneously calculated using a signal from a wheel speed sensor. When actuating an in-line mode switch under a state where the vehicle stops in the initial stop position, a turning angle is calculated so as to enable appropriate in-line parking to the parking frame from an actual initial stop position, based on a deviation of the vehicle from a reference position for the initial stop measured by the ultrasonic sensor. Information on a driving operation that is necessary for back parking is provided to a driver via a speaker based on this turning angle and output from a yaw rate sensor.

16 Claims, 11 Drawing Sheets

PARKING ASSISTING DEVICE

BACKGROUND OF THE INVENTION

1. Field of the Invention

The present invention relates to a parking assisting device, and more particularly to a device for guiding a driver a driving operation upon parking.

2. Description of the Related Art

Conventionally, there is an assisting device for showing a rear view of a vehicle on a television screen in a state where the vehicle stops in an initial stop position at a time of parking and superimposing to display on the television screen guiding information on a driving operation that is necessary for the parking. With such a device, parking can be easily conducted by merely performing the driving operation following the guiding information displayed on the television screen.

However, a burden is imposed on a driver if the driver performs the parking operation while looking at the television screen. Therefore, it is proposed to provide the guiding information through sound or the like. In this way, there is no need for the driver to pay attention to the television screen, and the burden imposed on the driver is reduced.

However, when the guiding information containing information ranging from an initial stop position to parking completion is provided to the driver through sound or the like, in a case where the initial stop position is deviated from a reference position set in advance, the deviation can not be eliminated, with the result that there is a fear that accuracy in the parking is degraded.

SUMMARY OF THE INVENTION

The present invention is made in view of solving the above-mentioned problem, and it is an object of the present invention to provide a parking assisting device capable of accurately guiding a driving operation even when a vehicle is not precisely stopped in a previously set reference position for an initial stop and performing parking assistance with high accuracy.

A parking assisting device according to the present invention includes: a first distance sensor for measuring a distance to an obstacle on a side of a vehicle; a second distance sensor for measuring a moving distance of the vehicle; yaw angle detecting means for detecting a yaw angle of the vehicle; guiding means for outputting guiding information on a driving operation to a driver; and a controller for grasping an initial stop position based on the distance to the obstacle on the side of the vehicle measured by the first distance sensor and the moving distance of the vehicle measured by the second distance sensor at a time of an advancing operation of the vehicle until reaching the initial stop position and for providing to the driver via the guiding means appropriate timing for a temporal stop for back parking based on the initial stop position and the yaw angle detected by the yaw angle detecting means.

Note that, it is possible to construct the controller so as to measure a deviation between an actual initial stop position and a reference position for the initial stop based on the distance to the obstacle on the side of the vehicle measured by the first distance sensor and the moving distance of the vehicle measured by the second distance sensor and simultaneously to calculate the appropriate timing for the temporal stop for the back parking based on the measured deviation and the yaw angle detected by the yaw angle detecting means.

In this case, the controller may guide via the guiding means the driver to an effect of stopping the vehicle when the controller judges that the vehicle has reached the initial stop position based on the distance to the obstacle on the side of the vehicle measured by the first distance sensor and the moving distance of the vehicle measured by the second distance sensor at the time of the advancing operation of the vehicle until reaching the initial stop position.

The controller can provide via the guiding means to the driver the guiding information of: advancing the vehicle with a steering angle at the maximum from the initial stop position and stopping the vehicle in a back start position; moving the vehicle backward with the steering angle at the maximum in an opposite direction from the back start position and stopping the vehicle in a steering wheel cutting position; and moving the vehicle backward with the steering angle at the maximum in the opposite direction again from the steering wheel cutting position so as to cause the vehicle to reach a target parking space.

Further, it is also possible to construct the controller so as to calculate the appropriate timing for the temporal stop through calculating an inclination of the vehicle with respect to the target parking space based on the distance to the obstacle on the side of the vehicle measured by the first distance sensor and the moving distance of the vehicle measured by the second distance sensor at the time of the advancing operation of the vehicle until reaching the initial stop position and adding this inclination to the deviation between the actual initial stop position and the reference position for the initial stop.

Further, it is also possible to construct the controller so as to calculate a suitable initial stop position based on the distance to the obstacle on the side of the vehicle measured by the first distance sensor and simultaneously guide via the guiding means the driver to an effect of stopping the vehicle when the controller judges that the vehicle has reached the initial stop position based on the moving distance of the vehicle measured by the second distance sensor.

The controller can provide via the guiding means to the driver guiding information of: moving the vehicle backward with the steering angle at the maximum from the initial stop position and stopping the vehicle at the steering wheel cutting position; and moving the vehicle backward with the steering angle at the maximum in the opposite direction from the steering wheel cutting position so as to cause the vehicle to reach the target parking space.

Further, the controller may calculate the inclination of the vehicle with respect to the target parking space based on the distance to the obstacle on the side of the vehicle measured by the first distance sensor and the moving distance of the vehicle measured by the second distance sensor at the time of the advancing operation of the vehicle until reaching the initial stop position, and calculate the suitable initial stop position according to this inclination.

The controller can also store as a history the distance to the obstacle on the side of the vehicle measured by the first distance sensor and the moving distance of the vehicle measured by the second distance sensor and simultaneously calculate the suitable initial stop position based on this history.

Note that, the controller can also measure a length of the target parking space based on the distance to the obstacle on the side of the vehicle measured by the first distance sensor and the moving distance of the vehicle measured by the second distance sensor at the time of the advancing operation of the vehicle until reaching the initial stop position.

Further, the controller may give a warning to the driver in a case where interference of the vehicle with the obstacle is predicted when the vehicle moves under a state of being held at a uniform steering angle.

It is possible to use an ultrasonic sensor or a sensor using an electromagnetic wave as the first distance sensor, and a wheel speed sensor as the second distance sensor, respectively.

DESCRIPTION OF THE PREFERRED EMBODIMENTS

Hereinafter, description will be made of embodiments of the present invention with reference to the accompanying drawings.

Embodiment 1

Figure 1:
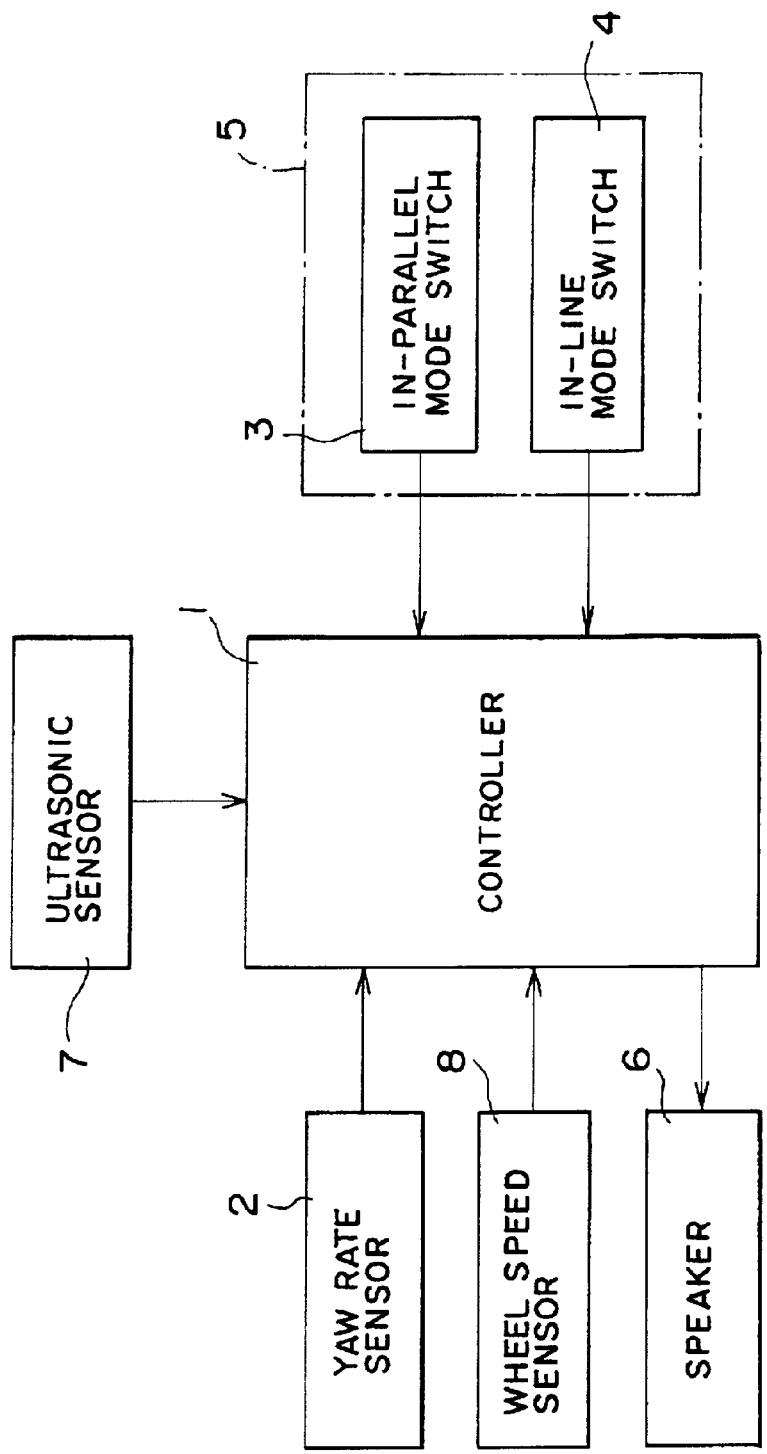
FIG. 1 is a block diagram showing a construction of a parking assisting device according to Embodiment 1 of the present invention.

FIG. 1 shows a construction of a parking assisting device in accordance with Embodiment 1 of the present invention. Connected to a controller 1 are: a yaw rate sensor 2 for detecting an angular speed in a direction of a yaw angle of a vehicle; a switch module 5 constituted by an in-parallel mode switch 3 for informing the controller 1 that a vehicle is parked in parallel; and an in-line mode switch 4 for informing the controller 1 that the vehicle is parked in line. Further, a speaker 6 for guiding driver information on a driving operation is connected with the controller 1.

In addition, the controller 1 is connected with an ultrasonic sensor 7 serving as a first distance sensor for measuring a distance to an obstacle on a side of the vehicle and a wheel speed sensor 8 serving as a second distance sensor for measuring a moving distance of the vehicle. The wheel speed sensor 8 detects rpm of wheels of the vehicle, and can calculate the moving distance of the vehicle based on a signal from the wheel speed sensor 8 by means of the controller 1.

The switch module 5 and the speaker 6 are arranged in a driver seat, and the ultrasonic sensor 7 is installed on a front end side portion of the vehicle.

The controller 1 is provided with a CPU, a ROM storing a control program and a working RAM (not shown).

In the ROM, there is stored data on a minimum turning radius Rc for a case where the vehicle turns with a steering wheel of the vehicle steered at maximum. At the same time, the control program for performing parking assistance upon the in-parallel parking and the in-line parking of the vehicle is stored in the ROM. The CPU operates based on the control program stored in the ROM. The controller 1 calculates a yaw angle of the vehicle from the angular speed of the vehicle inputted from the yaw rate sensor 2, calculates a turning angle of the vehicle and outputs information on an operation method and operation timing in each step during the parking operation to the speaker 6.

Figure 2:
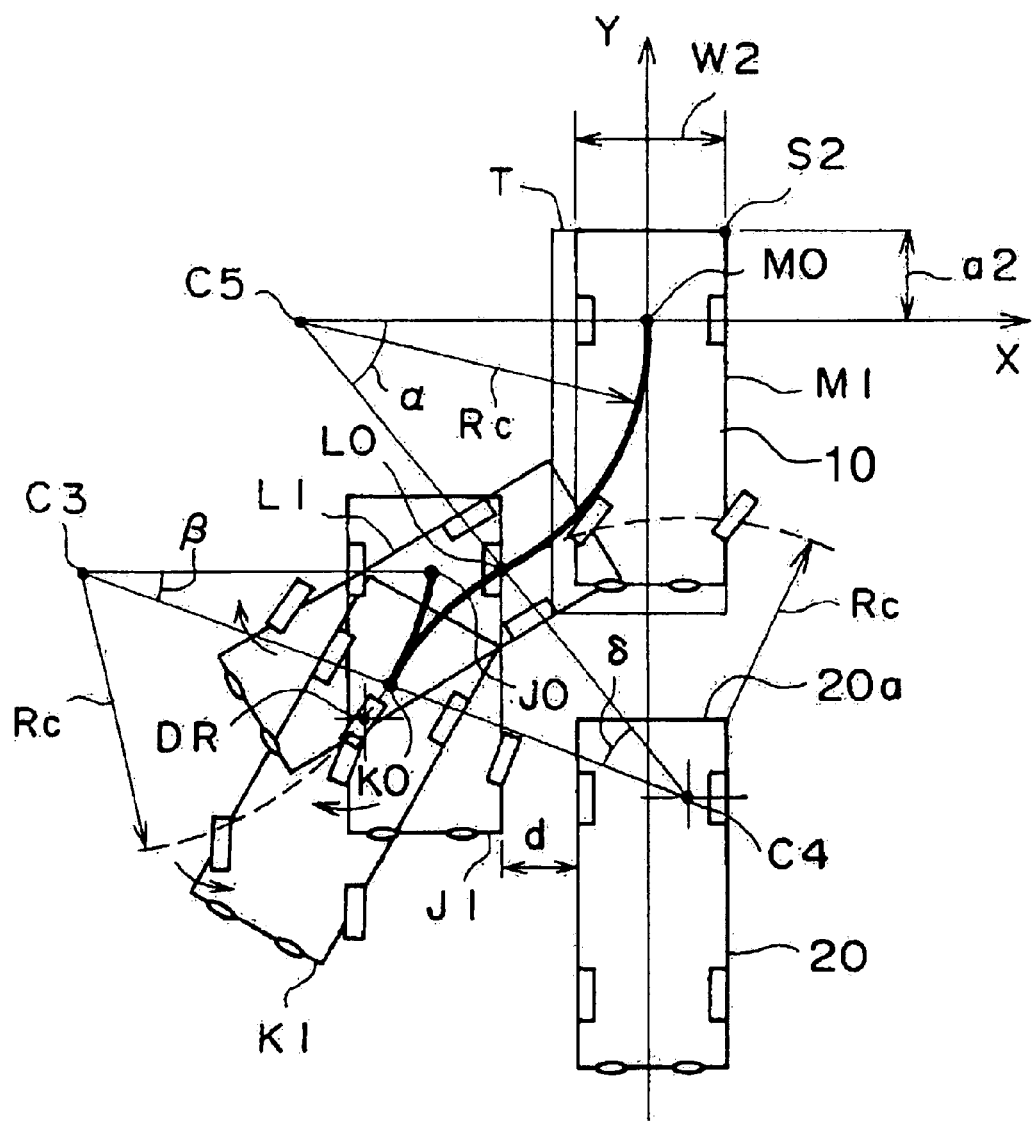
FIG. 2 is a diagram step-by-step and schematically showing positions of a vehicle at a time of parking in line in Embodiment 1.

Here, what kind of track the parking assisting device of this embodiment causes the vehicle to draw to assist in-line parking will be described with reference to FIG. 2.

It is assumed that a vehicle 10 is parked in a parking frame T such that a rear left end of the vehicle 10 coincides with a corner S2 in the back of the parking frame T. A rear axle center MO of the vehicle 10 in a vehicle position M1 in this state is assumed to be an origin, and a Y axis is taken in a direction in parallel with a road, which is a backward direction of the vehicle 10, and an X axis is taken perpendicularly to the Y axis. In addition, coordinates at the corner in the back of the parking frame T are assumed to be S2(W2/2, a2). Here, a2 and W2 denote a rear overhang and a vehicle width of the vehicle 10, respectively.

It is assumed that the vehicle 10 in a vehicle position J1 advances while turning at the radius Rc with a steering angle of the steering wheel at the maximum rightward; when the vehicle 10 reaches a vehicle position K1, the vehicle 10 moves backward while turning at the radius Rc with the steering angle at the maximum leftward; and, when the vehicle reaches a vehicle position L1, the vehicle 10 moves backward while turning at the radius Rc with the steering angle at the maximum rightward to appropriately be parked in the vehicle position M1 within the parking frame T.

First, it is assumed that the in-line parking is started with a vehicle 20 parked in a predetermined position in front of the parking frame T as a mark and that a state in which the vehicle 10 is parked in the vehicle position J1 is an initial stop position.

The vehicle position J1 is assumed to be a position where a Y coordinate of a position DR of a driver of the vehicle 10 coincides with the Y coordinate of a rear end 20*a* of the parked vehicle 20, which is a position in parallel with the parking frame T and a position where the vehicle 10 and the vehicle 20 are spaced apart from each other by a predetermined vehicle distance d. Therefore, coordinates (JOx, JOy) of a rear axle center JO of the vehicle position J1 are unconditionally defined from the relationship between the coordinates of the rear end 20*a* of the vehicle 20, the position DR of the driver and the rear axle center JO, and the vehicle distance d.

The vehicle 10 in the vehicle position J1 advances to the vehicle position K1 while turning at the radius Rc with the steering angle of the steering wheel at the maximum rightward. In this case, a turning center is assumed to be C3 and a turning angle is assumed to be β. In addition, the vehicle 10 in the vehicle position K1 moves backward to the vehicle position L1 while turning at the radius Rc with the steering angle at the maximum leftward. In this case, a turning center is assumed to be C4 and a turning angle is assumed to be δ. Moreover, the steering wheel is cut in the opposite direction in the vehicle position L1 and the vehicle 1 moves backward to the vehicle position M1 while turning at the minimum turning radius Rc with the steering angle at the maximum rightward. In this case, a turning center is assumed to be C5 and a turning angle is assumed to be α.

In addition, rear axle centers in the vehicle positions K1 and L1 are assumed to be KO and LO, respectively.

The turning angles α, β and δ have the following relation.

$$\delta = \alpha - \beta$$

Coordinates (C5x, C5y) of the turning center C5 are represented by the following expressions.

$$C5x = -Rc$$

$$C5y = 0$$

Coordinates (C4x, C4y) of the turning center C4 are represented by the following expressions.

$$C4x = C5x + (Rc+Rc) \cdot \cos \alpha = -Rc + 2Rc \cdot \cos \alpha$$

$$C4y = C5y - (Rc+Rc) \cdot \sin \alpha = -2Rc \cdot \sin \alpha$$

Coordinates (C3x, C3y) of the turning center C3 are represented by the following expressions.

$$C3x = C4x - (Rc+Rc) \cdot \cos \beta = -Rc + 2Rc \cdot \cos. -2Rc \cdot \cos \beta$$

$$C3y = C4y + (Rc+Rc) \cdot \sin \beta = -2Rc \cdot \sin. + 2Rc \cdot \sin \beta$$

In addition, coordinates (JOx, JOy) of the rear axle center JO of the vehicle position J1 are represented by the following expressions.

$$JOx = -Rc \cdot (1-\cos \alpha) - Rc \cdot (1-\cos \alpha -1 + \cos \beta) + Rc \cdot (1-\cos \beta) = 2Rc \cdot (\cos \alpha - \cos \beta) \quad (1)$$

$$JOy = -Rc \cdot \sin \alpha - Rc \cdot (\sin \alpha - \sin \beta) + Rc \cdot \sin \beta = 2Rc \cdot (\sin \beta - \sin \alpha) \quad (2)$$

Here, when the above-mentioned expressions (1) and (2) are transformed using a formula of the trigonometric functions, the following expressions are obtained.

$$\tan(\alpha/2 + \beta/2) = JOx/JOy$$

$$\sin^2(\alpha/2 - \beta/2) = (JOx^2 + JOy^2)/(16Rc^2)$$

α and β can be calculated using the coordinates (JOx, JOy) of the known rear axle center JO and these values are stored in the controller 1 as set values α and β.

The coordinates (JOx, JOy) of the rear axle center JO use, for example, the values of JOx=2.3 m and JOy=4.5 m as values for allowing the vehicle 10 to be parked behind the vehicle 20 by a natural operation. It is desirable to set the values of the coordinates JOx and JOy of the rear axle center JO according to a grade, steering property and the like of the vehicle 10.

Next, an operation of the parking assisting device in accordance with Embodiment 1 at the time of the in-line parking will be described.

Figure 3:
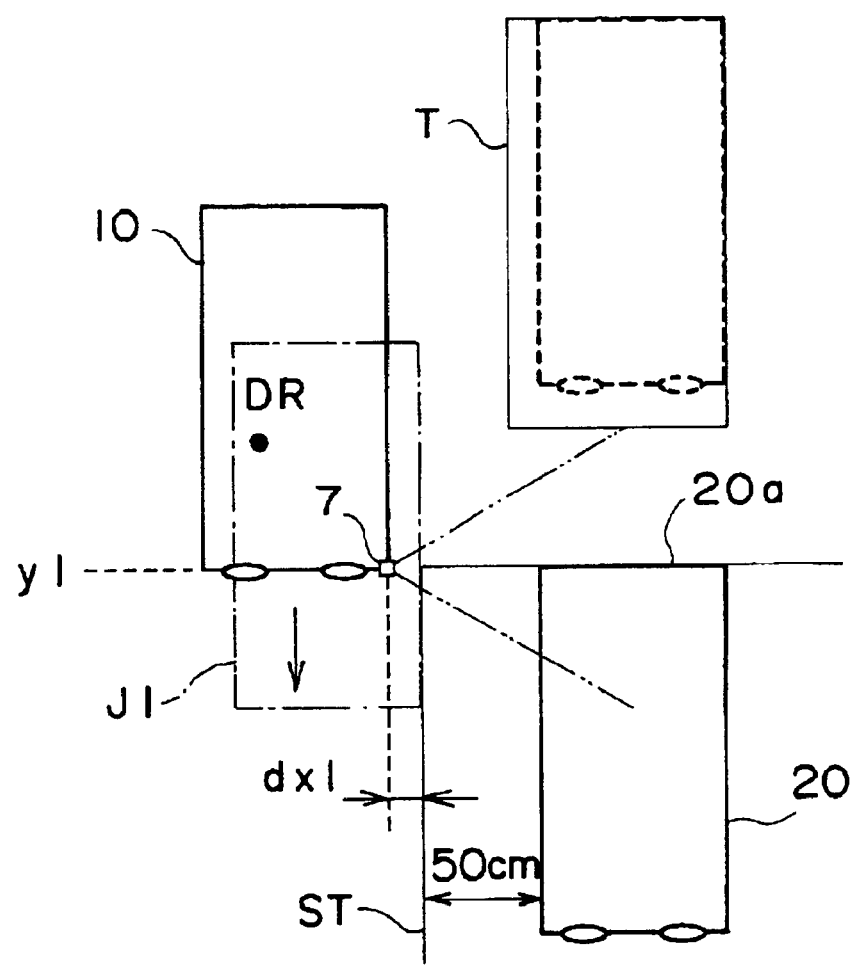
FIG. 3 is a plan view showing a state where the vehicle is positioned in a spot before reaching an initial stop position at the time of the parking in line in Embodiment 1.
Figure 4:
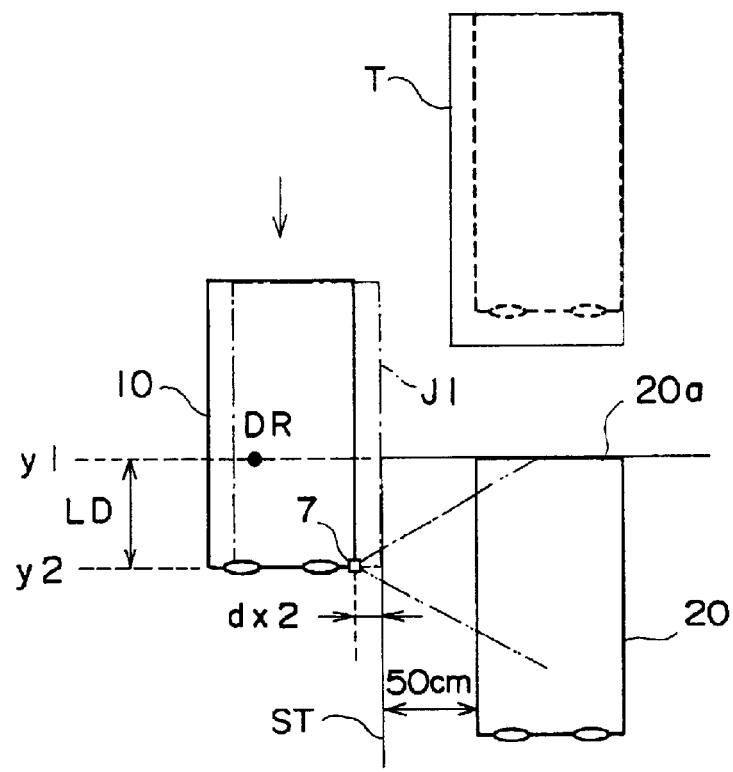
FIG. 4 is a plan view showing a state where the vehicle is positioned in the initial stop position at the time of the parking in line in Embodiment 1.

First, as shown in FIG. 3, the vehicle 10 advances straight forward in parallel with the road, namely, in parallel with the target parking frame T, to the vehicle position J1, which is the position where the Y coordinate of the position DR of the driver coincides with the Y coordinate of the rear end 20a of the parked vehicle 20 and the vehicle 10 and the vehicle 20 are spaced apart from each other by the vehicle distance d, for example, by 50 cm. In this case, while the vehicle 10 advances, measurement of a distance from the vehicle 10 to the obstacle on the side of the vehicle, the parked vehicle 20, for example, is continuously performed by means of the ultrasonic sensor 7 that is installed on the front end side portion of the vehicle. The vehicle 10 gradually approaches the vehicle position J1, and reaches the position where the Y coordinate of the position DR of the driver coincides with the Y coordinate of the rear end 20a of the parked vehicle 20, as shown in FIG. 4.

Figure 5:
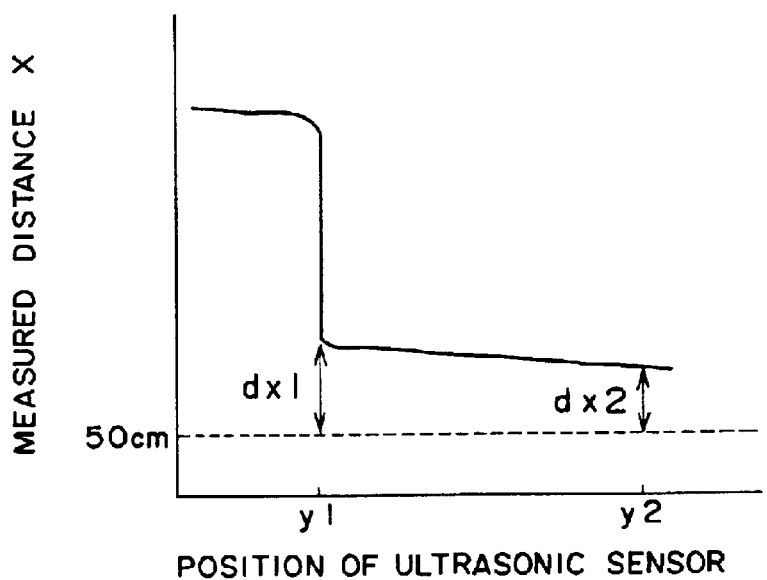
FIG. 5 is a graph showing a measured distance with respect to a position of an ultrasonic sensor in Embodiment 1.

Here, FIG. 5 shows a measured distance x to the obstacle corresponding to the position of the ultrasonic sensor 7, being accompanied with the vehicle 10 that is advancing. There is not existed a vehicle in the target parking frame T, and thus the measured distance x becomes an extremely large value when the vehicle 10 passes the side of the parking frame T. However, as shown in FIG. 3, when a Y coordinate of the ultrasonic sensor 7 reaches a coordinate y1, which coincides with the Y coordinate of the rear end 20a of the parked vehicle 20, the measured distance x abruptly decreases to be a distance from the ultrasonic sensor 7 to the vehicle 20. The measured distance x in this case can be expressed by a sum of the distance of 50 cm from the vehicle 20, which is a reference position ST for the initial stop, and a deviation dx1 in an x direction.

The controller 1 can recognize that the ultrasonic sensor 7 has arrived at the coordinate y1 based on this abrupt change in the measured distance x. Then, the controller 1 stores a length LD from a front end of the vehicle 10 to the position DR of the driver in advance and monitors a moving distance of the vehicle 10, which was calculated by a signal from the wheel speed sensor 8. When the vehicle 10 has advanced by the distance LD from the point where the ultrasonic sensor 7 reaches the coordinate y1, specific stop sound is emitted for the driver via the speaker 6. The driver stops the vehicle 10 upon hearing this stop sound. As a result, the Y coordinate of the position DR of the driver coincides with the Y coordinate of the rear end 20a of the parked vehicle 20, whereby the position is made to be the initial stop position. The measured distance x obtained by the ultrasonic sensor 7 in this case can be expressed by a sum of the distance of 50 cm from the vehicle 20 serving as the reference position ST for the initial stop and a deviation dx2 in the x direction.

It is difficult to precisely position the vehicle 10 in the reference position ST for the initial stop, and thus the above-mentioned deviations dx1 and dx2 in the x direction are likely to generate. Note that, the deviation dx1 and the deviation dx2 are equal to each other when the vehicle 10 travels in parallel with the parked vehicle 20. However, in a case where the vehicle 10 travels slantly with a certain inclination, the values of the deviations become different from each other. The distance between the coordinates y1 and y2 is the distance LD that is stored in advance in the controller 1. Thus, it is possible to obtain even the inclination of the vehicle 10 in this initial stop position with respect to the reference position ST for the initial stop from the deviations dx1 and dx2 and the distance LD.

Accordingly, when the driver activates the in-line mode switch 4 in the state where the vehicle 10 stops in the initial stop position, the controller 1 obtains coordinates (JOx+dx, JOy+dy) of a rear axle center JO' as an actual initial stop position from the thus measured deviations dx1 and dx2 and the normal coordinates JOx and Joy of the rear axle center JO, to thereby calculate the above-mentioned turning angles α, β and δ so as to appropriately park the vehicle 10 in line in the parking frame T.

The controller 1 sets the initial stop position as a position where the yaw angle of the vehicle is zero degree and simultaneously activates a program for in-line parking based on the operation of the in-line mode switch 4. The driver steers the steering wheel of the vehicle 10 to the maximum rightward to bring it to a fully cut state and advances the vehicle 10 in that state. The controller 1 calculates the yaw angle of the vehicle from the angular speed of the vehicle 10 inputted from the yaw rate sensor 2 and compares this yaw angle with the value of the calculated turning angle β. As the vehicle 10 approaches the vehicle position K1, which is a back start position, from the initial stop position, the controller 1 informs the driver of approach information notifying that the vehicle has approached the vehicle position K1 and arrival information notifying that the vehicle has reached the vehicle position K1 based on the difference between the yaw angle and the calculated turning angle β via the speaker 6.

For example, intermittent sound such as "blip, blip" is emitted from the speaker 6 as the approach information, and the cycle of this intermittent sound and blinking becomes shorter when the difference between the yaw angle and the turning angle β is decreased. When the difference between the yaw angle and the turning angle β is eliminated, continuous sound such as "bleep" is emitted from the speaker 6 as the arrival information.

The driver stops the vehicle 10 in the vehicle position K1 in accordance with the arrival information. Next, the driver steers the steering wheel to the maximum leftward to bring it to a fully cut state and moves the vehicle 10 backward in that state. The controller 1 compares the yaw angle of the vehicle and the value of the calculated turning angle α (=β+δ). As the vehicle 10 approaches the vehicle position L1, which is a steering wheel cutting position, from the vehicle position K1, that is, as the yaw angle of the vehicle approaches the value of the calculated turning angle α, the controller 1 informs the driver of approach information notifying that the vehicle has approached the vehicle position L1 and arrival information notifying that the vehicle has reached the vehicle position L1 based on the difference between the yaw angle and the calculated turning angle α via the speaker 6.

The driver stops the vehicle 10 in the vehicle position L1 in accordance with the arrival information. Next, the driver cuts the steering wheel in the opposite direction in the vehicle position L1, steers it to the maximum rightward to bring it to a fully cut state and moves the vehicle 10 backward in that state. As the yaw angle of the vehicle 10 approaches zero degree, the controller 1 informs the driver of approach information notifying that the vehicle has approached the vehicle position M1 within the parking frame T and arrival information notifying that the vehicle has reached the vehicle position M1 via the speaker 6. In this manner, the driver stops the vehicle 10 in the vehicle position M1, whereby the parking is completed.

Embodiment 2

Figure 6:
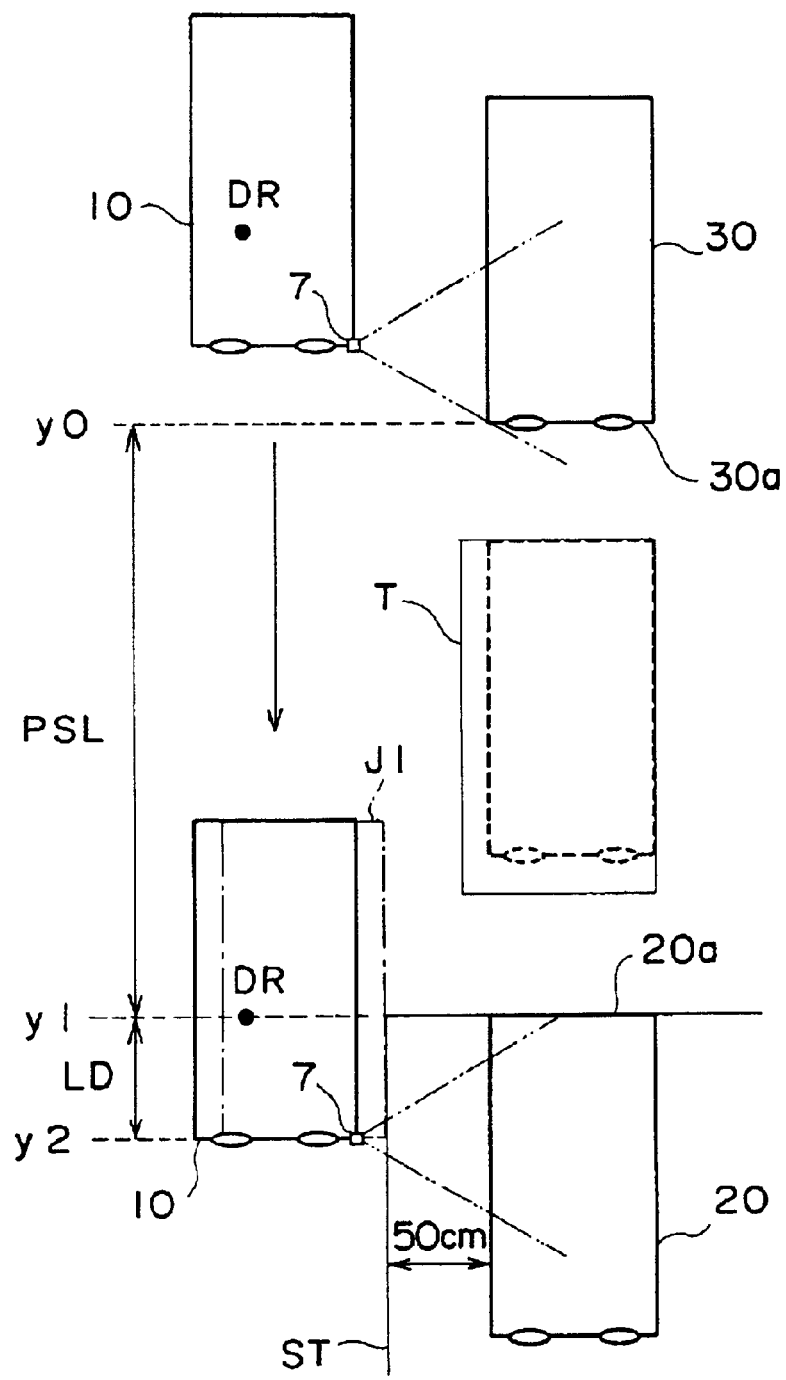
FIG. 6 is a plan view showing a state where a vehicle is positioned in each position at a time of parking in line in Embodiment 2.

A parking assisting device according to Embodiment 2 has the same construction as the parking assisting device of Embodiment 1 shown in FIG. 1. However, as shown in FIG. 6, the parking assisting device according to this embodiment is effective in a case where not only is the vehicle 20 already parked in front of the target parking frame T but also a vehicle 30 is parked behind the target parking frame T.

First, while the vehicle 10 advances straight forward in parallel with the road from a side of the vehicle 30 that is parked behind the target parking frame T, measurement of a distance to the obstacle on the side of the vehicle is continuously performed by means of the ultrasonic sensor 7. This distance measurement by means of the ultrasonic sensor 7 is continuously performed until the vehicle 10 reaches the initial stop position, that is, until the vehicle 10 reaches the position where the Y coordinate ace of the position DR of the driver coincides with the Y coordinate of the rear end 20a of the parked vehicle 20.

Figure 7:
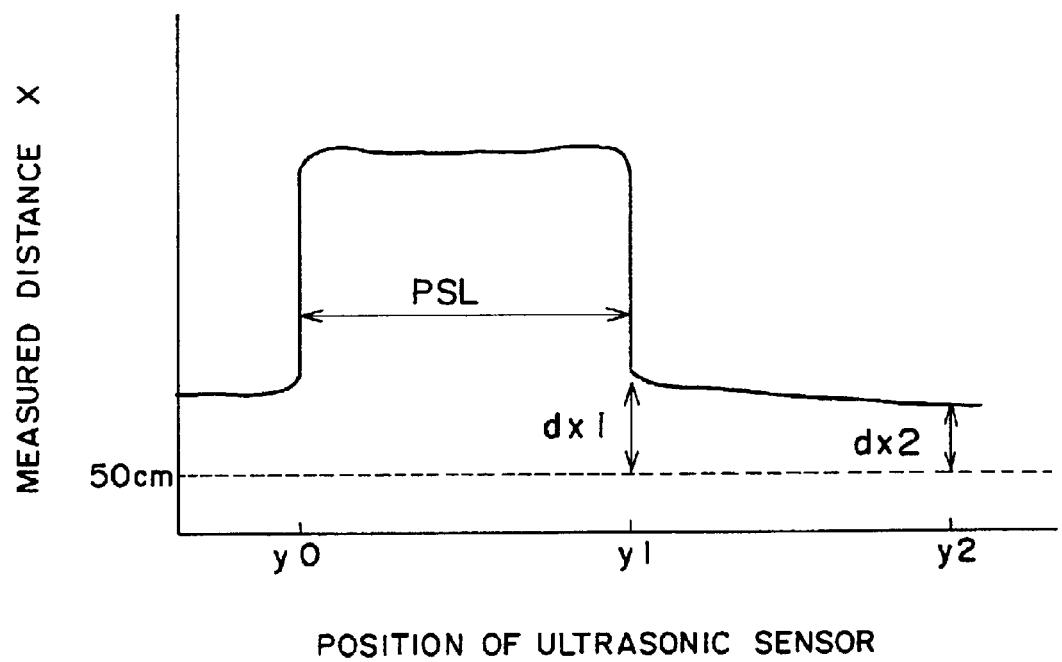
FIG. 7 is a graph showing a measured distance with respect to a position of an ultrasonic sensor in Embodiment 2.

In this case, in accordance with the advancement of vehicle 10, a distance x measured with the ultrasonic sensor 7 is shown in FIG. 7. A distance to the vehicle 30 that is parked behind the parking frame T is measured first. However, a vehicle does not exist after a time when a Y coordinate of the ultrasonic sensor 7 reaches a coordinate y0 which coincides with a Y coordinate of a front end 30a of the parked vehicle 30, and thus the measured distance x becomes an extremely large value. Further, when the Y coordinate of the ultrasonic sensor 7 reaches the coordinate y1 which coincides with the Y coordinate of the rear end 20a of the vehicle 20 that is parked in front of the parking frame T, the measured distance x abruptly decreases to be a distance from the ultrasonic sensor 7 to the vehicle 20. Accordingly, the controller 1 can recognize that the ultrasonic sensor 7 has arrived at the coordinates y0 and y1 based on this abrupt change in the measured distance x, and a distance PSL by which the vehicle 10 has moved during the above-mentioned operation can be calculated using a signal from the wheel speed sensor 8. This distance PSL expresses a length of a parking space formed by the parked vehicles 30 and 20.

After the ultrasonic sensor 7 reaches the coordinate y1, as in Embodiment 1, when the vehicle 10 has advanced by the distance LD and the ultrasonic sensor 7 reaches the coordinate y2, specific stop sound is emitted for the driver via the speaker 6. The driver stops the vehicle 10 upon hearing this stop sound. As a result, the Y coordinate of the position DR of the driver becomes a position which coincides with the Y coordinate of the rear end 20a of the parked vehicle 20, which becomes the initial stop position.

Then, when the driver actuates the in-line mode switch 4 in a state where the vehicle 10 stops in the initial stop position, the controller 1 calculates the turning angles α, β and δ so that the driver can appropriately park the vehicle 10 in line from the actual initial stop position to the parking frame T based on the measured deviations dx1 and dx2 and the length PSL of the parking space.

As in Embodiment 1, the controller 1 provides the driver appropriate timing for a temporal stop under a fully cut state of the steering wheel via the speaker 6 based on the thus calculated turning angles α, β and δ, whereby the driver can complete the in-line parking to the parking frame T.

Embodiment 3

A parking assisting device according to Embodiment 3 has the same construction as the parking assisting device of Embodiment 1 shown in FIG. 1. However, the parking assisting device according to this embodiment is a device provided not for stopping the vehicle in the reference position for the initial stop set in advance, but for guiding the driver an appropriate initial stop position that is calculated by the controller 1 based on a distance x to an obstacle on a side of the vehicle measured by the ultrasonic sensor 7. Further, guiding information is provided to the driver, in which: the vehicle moves backward by bringing the steering angle to the maximum from the initial stop position and the vehicle stops in a steering wheel cutting position; and the vehicle moves backward by bringing the steering angle to the maximum in the opposite direction from the steering wheel cutting position, whereby the vehicle reaches the target parking space.

Figure 8:
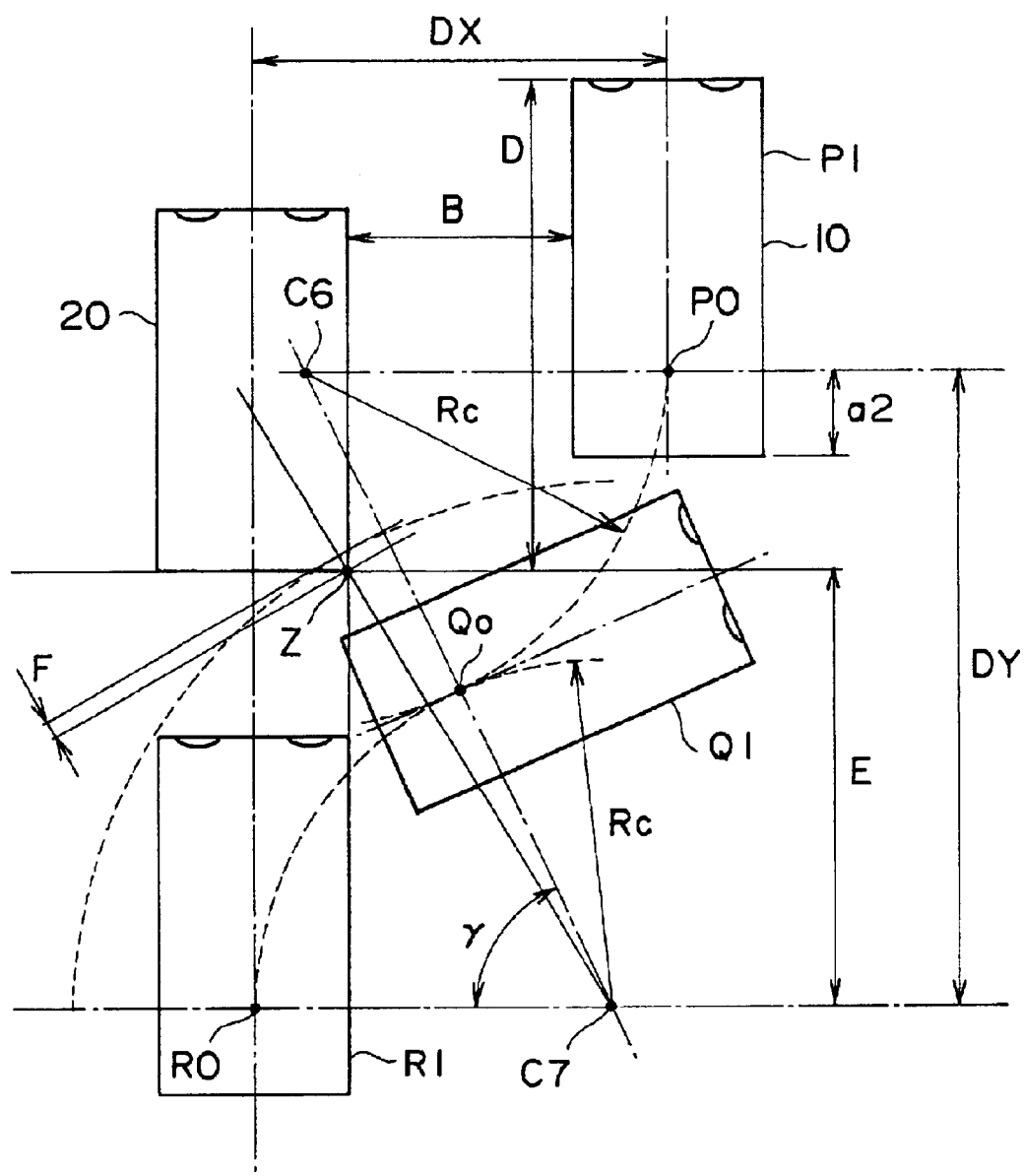
FIG. 8 is a diagram step-by-step and schematically showing positions of a vehicle at a time of parking in line in Embodiment 3.

Description will be made of a calculating method of the suitable initial stop position with reference to FIG. 8. A vehicle distance between the vehicle 10 and the parked vehicle 20 is assumed to be B. When respective widths of these vehicles are assumed to be W2, a distance DX by which the vehicle 10 should be moved in an X direction through a parking operation is represented by the following expression.

$$DX=B+W2$$

When a turning angle by which a rear axle center of the vehicle 10 moves from P0 in an initial stop position P1 to Q0 in a steering wheel cutting position Q1 is assumed to be $\gamma$ and a minimum turning radius of the rear axle center is assumed to be Rc, it is represented by the following expression.

$$DX=2Rc \cdot (1-\cos \gamma)$$

Here, the distance DX can be measured by the ultrasonic sensor 7 and the minimum turning radius Rc is known, and thus the turning angle $\gamma$ can be calculated from the above-mentioned expression.

When the turning angle $\gamma$ is obtained, a distance DY between positions P0 and R0 of the rear axle center in a Y direction can be obtained by the following expression.

$$DY=2Rc \cdot \sin \gamma$$

An interference allowance between a right rear end Z of the parked vehicle 20 and a left front end of the vehicle 10 upon turning of the vehicle 10 is assumed to be F. Note that, in FIG. 8, both interfere with each other, and thus F becomes a negative value.

A turning radius Rf1 of the left front end of the vehicle 10 is represented by the following expression by assuming a full length of the vehicle 10 as L.

$$Rf1=\{(Rc+W2/2)^2+(L-a2)^2\}^{1/2}$$

On the other hand, a distance ZC7 between the right rear end Z of the vehicle 20 and a turning center C7 of the vehicle 10 is represented by the following expression using a distance E between the right rear end Z of the vehicle 20 and the turning center C7 of the vehicle 10 in the Y direction.

$$ZC7=\{(Rc-W2/2)^2+E^2\}^{1/2}$$

The interference allowance F is represented by the following expression.

$$F=ZC7-Rf1$$

Therefore, the value of the distance E can be determined by substituting a specific numerical value, for example, 40 cm, for F.

Here, the distance DY was already obtained, and thus a forward distance D from a rear end of the parked vehicle 20 to a front end of the vehicle 10 at the initial stop position P1 is represented by the following expression.

$$D=DY-E+L-a2$$

In this manner, the forward distance D can be obtained from the vehicle distance B between the vehicle 10 and the parked vehicle 20.

Next, description will be made of an operation upon in-line parking of the parking assisting device according to Embodiment 3.

First, the vehicle 10 advances forward in parallel with a road, and the in-line mode switch 4 is actuated while the vehicle 10 passes the side of the parking space. With this, measurement of a distance to the parked vehicle 20 is continuously performed by means of the ultrasonic sensor 7 installed on the front end side portion of the vehicle 10. In the same manner as that in Embodiment 1, the controller 1 recognizes that the ultrasonic sensor 7 reaches the rear end position of the vehicle 20 and simultaneously measures the vehicle distance B between the vehicle 10 and the vehicle 20. According to the above-mentioned procedure, the forward distance D from the rear end of the vehicle 20 to the front end of the suitable initial stop position P1 and the turning angle $\gamma$ required thereafter can be determined.

The controller 1 monitors a moving distance of the vehicle 10 calculated using a signal from the wheel speed sensor 8. When the vehicle 10 has advanced by the forward distance D from a point where the ultrasonic sensor 7 reaches the rear end position of the parked vehicle 20, specific stop sound is emitted for the driver via the speaker 6. The driver stops the vehicle 10 upon hearing this stop sound. As a result, the vehicle 10 stops in the suitable initial stop position P1. In this case, the controller 1 resets a yaw angle of the vehicle 10 obtained by the yaw rate sensor 2.

Thereafter, the driver steers the steering wheel of the vehicle 10 to the maximum leftward to bring it to a fully cut state and moves the vehicle 10 backward in that state. The controller 1 compares the yaw angle of the vehicle to the value of the determined turning angle $\gamma$, outputs approach information via the speaker 6 when the yaw angle approaches the turning angle $\gamma$, and further outputs arrival information via the speaker 6 when the yaw angle becomes equal to the turning angle $\gamma$, judging that the vehicle 10 has reached the steering wheel cutting position Q1.

The driver stops the vehicle 10 in the steering wheel cutting position Q1 according to the arrival information. Here, the driver cuts the steering wheel in the opposite direction and steers it to the maximum rightward to bring it to a fully cut state, and moves the vehicle 10 backward in that state. As the yaw angle of the vehicle 10 approaches zero degree, the controller 1 informs the driver of the approach information notifying that the vehicle has approached a vehicle position R1 within the target parking space and the arrival information notifying that the vehicle has reached the vehicle position R1 via the speaker 6. In this manner, the driver can stop the vehicle 10 in the vehicle position R1, whereby parking is completed.

Figure 9:
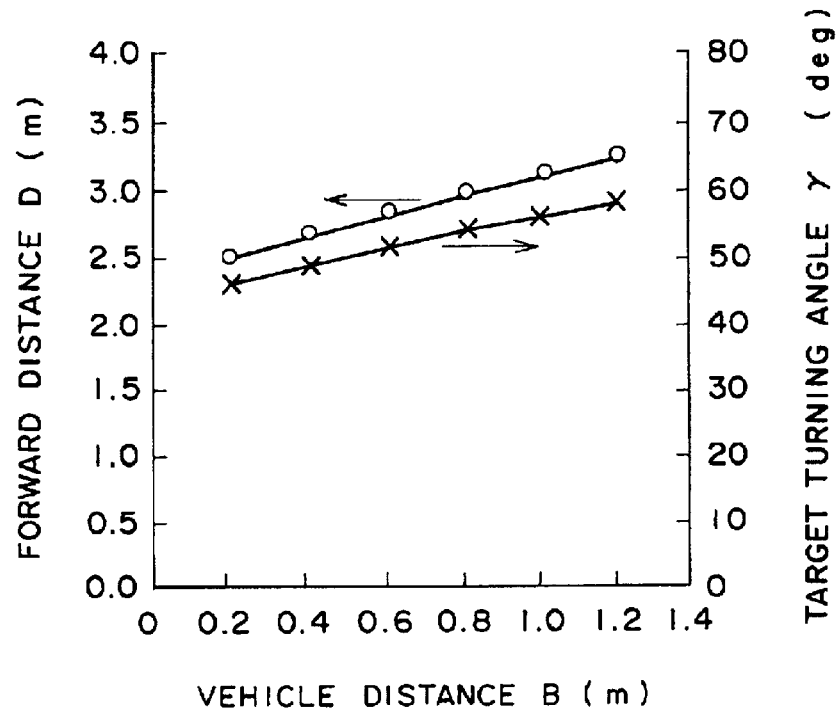
FIG. 9 is a graph showing a relationship between a forward direction distance D ranging from a rear end of a parked vehicle to a front end of a suitable initial stop position and a turning angle γ required thereafter with respect to a vehicle distance B in Embodiment 3.

Note that, the relationship of the distance D from the rear end of the parked vehicle 20 to the front end of the suitable initial stop position P1 and the vehicle distance B of the turning angle $\gamma$ required thereafter is determined based on characteristics of the vehicle 10 as shown in, for example, FIG. 9.

Also in Embodiment 3, in the same manner as in Embodiment 2, it is possible to guide capability and incapability of the parking through measuring the length of the target parking space when the vehicle advances straight forward toward the initial stop position, and to warn interference with the obstacle such as the vehicle that is parked behind.

Embodiment 4

Figure 10:
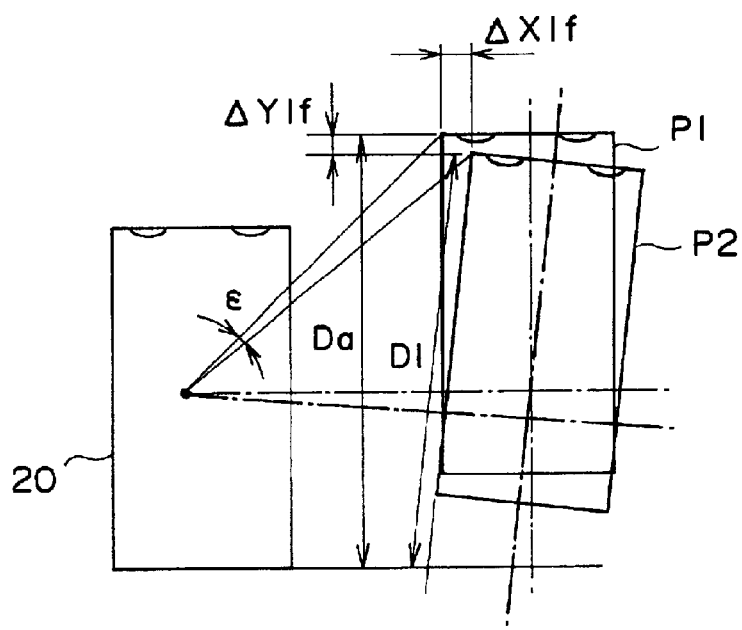
FIGS. 10 to 13 are diagrams and a graph showing a method of calculating a suitable initial stop position in Embodiment 4, respectively.

Embodiment 4 is effective for a case where a direction in which the vehicle advances straight forward toward the initial stop position is not in parallel with the parked vehicle 20 but has an inclination angle $\epsilon$. As shown in FIG. 10, the vehicle 10 in a position P2 that is parked in a state of being inclined by the angle $\epsilon$ can be regarded to be in a state where the vehicle 10 moves backward by the angle $\epsilon$ through a parking operation from a position P1 where the vehicle 10 stops in parallel with the parked vehicle 20.

When it is assumed that the vehicle 10 in the position P1 moves backward by the angle $\epsilon$ at the turning radius Rc to be in the position P2, coordinates (X1$f$, Y1$f$) of a left front end of the vehicle 10 in the position P2 are represented by the following expressions by using coordinates (X0$f$, Y0$f$) of a left front end of the vehicle 10 in the position P1 by taking a turning center as an origin.

$$X1f = X0f \cdot \cos \epsilon + Y0f \cdot \sin \epsilon$$

$$Y1f = Y0f \cdot \cos \epsilon - X0f \cdot \sin \epsilon$$

Therefore, an X direction displacement $\Delta X1f$ of the left front end of the vehicle 10 between the positions P1 and P2 can be represented by the following expression.

$$\Delta X1f = X1f - X0f = Y0f \cdot \sin \epsilon - X0f \cdot (1 - \cos \epsilon)$$

When the X direction displacement $\Delta X1f$ is expressed by a parameter of the actual vehicle 10, it is represented by the following expression.

$$\Delta X1f = (L-a2) \cdot \sin \epsilon - (Rc - W2/2) \cdot (1 - \cos \epsilon)$$

Figure 11:
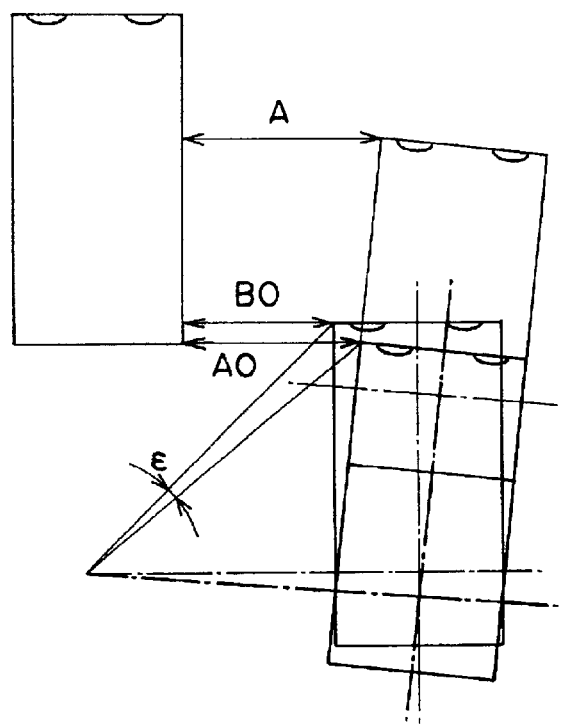

In the actual vehicle 10, as shown in FIG. 11, for example, when a horizontal distance obtained upon detecting a rear end of the parked vehicle 20 by means of the ultrasonic sensor 7 installed on the front end side portion of the vehicle 10 is assumed to be A0, a horizontal distance B0 of the vehicle that is in parallel with the vehicle 20 corresponding to this distance A0 is represented by the following expression.

$$B0 = A0 - \Delta X1f = A0 - (L \cdot a2) \cdot \sin \epsilon + (Rc - W2/2) \cdot (1 - \cos \epsilon)$$

Figure 12:
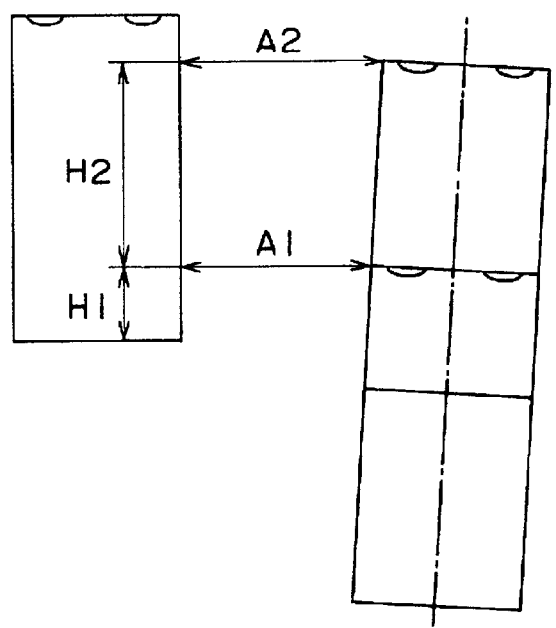

Incidentally, as shown in FIG. 12, for example, the inclination angle $\epsilon$ is obtained from: a vehicle distance A1 of the vehicle 10 to the vehicle 20 obtained when the vehicle 10 has advanced by a distance H1 from the point where the ultrasonic sensor 7 detects the rear end of the parked vehicle 20; and a vehicle distance A2 of the vehicle 10 to the vehicle 20 obtained when the vehicle 10 has further advanced by a distance H2, which is represented by the following expression.

$$\epsilon = \tan^{-1}\{(A2-A1)/H2\}$$

Figure 13:
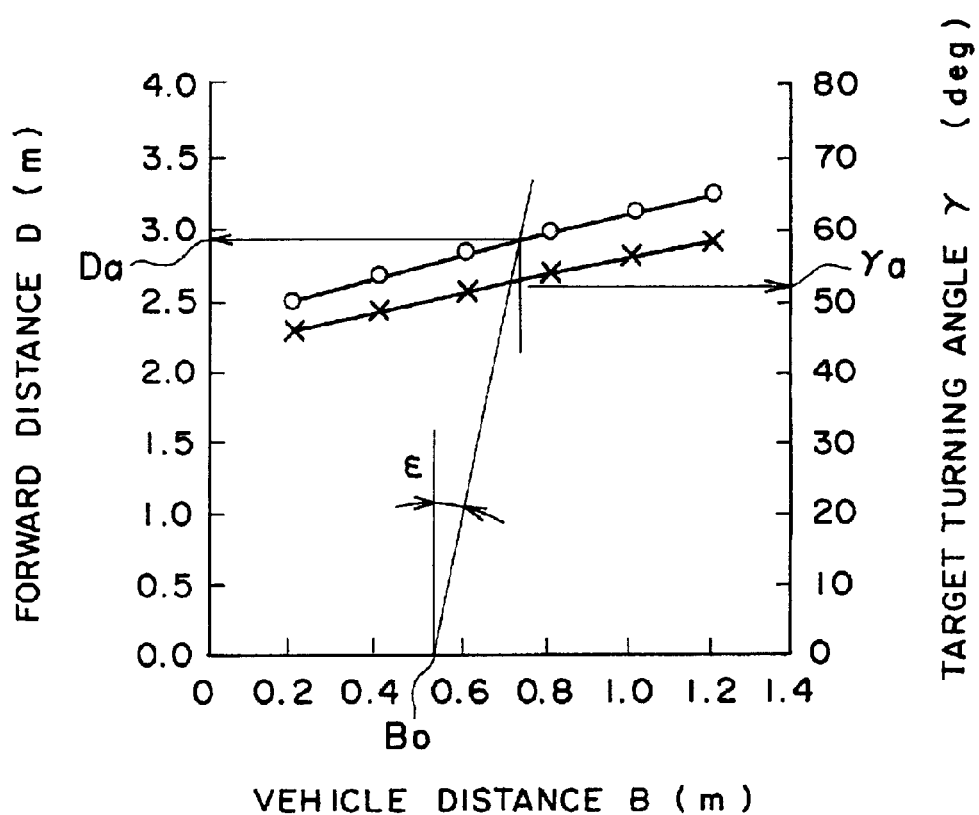

Next, as shown in FIG. 13, in a graph showing a relationship between the forward distance D with respect to the vehicle distance B and the turning angle $\gamma$, it is possible to obtain a suitable forward distance Da for a case where the vehicle 10 is replaced by the vehicle that is in parallel with the parked vehicle 20 based on an intersection point of a solid line of the inclination $\epsilon$ extending from a point of the vehicle distance B0 when the forward distance D is 0 with a curve representing the forward distance D. Further, a suitable turning angle $\gamma$ a can be obtained based on an intersection point of a solid line that is drawn in parallel with a Y axis from the intersection point of the solid line of the inclination $\epsilon$ with the curve representing the forward distance D with the curve representing the turning angle $\gamma$.

In FIG. 10, a Y direction displacement $\Delta Y1f$ of the left front end of the vehicle 10 between the positions P1 and P2 can be represented by the following expression.

$$\Delta Y1f = Y1f - Y0f = -\{X0f \cdot \sin \epsilon + Y0f \cdot (1 - \cos \epsilon)\}$$

When the Y direction displacement $\Delta Y1f$ is expressed by a parameter of the actual vehicle 10, it is represented by the following expression.

$$\Delta Y1f = -\{(Rc - W2/2) \cdot \sin \epsilon + (L-a2) \cdot (1 - \cos \epsilon)\}$$

It can be considered that the vehicle inclined by the angle $\epsilon$ positions being separated backward by the above-mentioned Y direction displacement $\Delta Y1f$ from the vehicle in parallel with the parked vehicle 20. Thus, the vehicle may move in a Y direction by a distance, which is obtained by subtracting the Y direction displacement $\Delta Y1f$ from the forward distance Da, and may move in an inclined direction of the angle $\epsilon$ by a distance D1, which is represented by the following expression.

$$D1 = (Da - \Delta Y1f)/\cos \epsilon = [Da + \{(Rc - W2/2) \cdot \sin \epsilon + (L-a2) \cdot (1-\cos \epsilon)\}]/\cos \epsilon$$

Further, regarding the turning angle $\gamma$, the vehicle has already turned by the angle $\epsilon$ from the vehicle in parallel with the parked vehicle 20. Thus, the turning angle $\gamma$ becomes a turning angle to a steering wheel cutting position from the initial stop position where an angle $\gamma 1$ represented by the following expression of:

$$\gamma 1 = \gamma a - \epsilon$$

is inclined by the angle $\epsilon$.

Note that, a turning angle to a target parking space from the steering wheel cutting position is $\gamma$ a.

Therefore, in Embodiment 3, in a case where it is judged that the direction in which the vehicle advances straight forward toward the initial stop position inclines by the angle$\epsilon$ with respect to the parked vehicle 20, guiding information may be outputted to the driver so as to stop the vehicle 10 when the vehicle has advanced slantly by the above-mentioned distance D1 from the point where the ultrasonic sensor 7 reaches the rear end position of the parked vehicle 20; again stop the vehicle when the vehicle has moved backward by the angle $\gamma 1$ from the initial stop position with the steering wheel steered at the maximum leftward; and complete the parking when the vehicle has moved backward by the angle $\gamma$ a with the steering wheel cut at the maximum rightward.

Also in Embodiment 4, in the same manner as in Embodiment 2, it is possible to guide capability and incapability of the parking through measuring the length of the target parking space when the vehicle advances straight forward toward the initial stop position, and to warn interference with the obstacle such as the vehicle that is parked behind.

It is desirable that a correction be performed for the measurement of the vehicle distance to the parked vehicle 20 by the ultrasonic sensor 7 according to an influence caused by a curve in a corner of the vehicle and characteristics of the sensor.

Further, the description has been made of the case where the distance D1 and the angle $\gamma 1$ are obtained geometrically; however, it may also be possible to calculate those analytically.

Embodiment 5

Instead of the above-mentioned Embodiments 3 and 4 in which the distance to the parked vehicle 20 starts to be measured by actuating the in-line mode switch 4 while the vehicle 10 passes the side of the parking space, the initial stop position is calculated in Embodiment 5 by constantly performing a measurement of a distance to the obstacle on the side of the vehicle by means of the ultrasonic sensor 7 and a measurement of a traveling distance of the vehicle by means of the wheel speed sensor 8, storing the distance to the obstacle on the side of the vehicle according to the traveling distance as a history, and using this history for the calculation.

The controller 1 constantly actuates the ultrasonic sensor 7 and the wheel speed sensor 8, and stores as a history the distance to the obstacle on the side of the vehicle according to the traveling distance for a past predetermined amount of time or predetermined traveling distance based on a signal inputted from these sensors.

The vehicle 10 stops on the side of the parked vehicle 20 by passing the side of the parking space in the same manner as it does in the initial stop position of Embodiments 3 and 4, for example, and the in-line mode switch 4 is actuated. In this manner, the controller 1 calculates an appropriate initial stop position for in-line parking in the parking space through the calculation method described in Embodiment 3 or 4, based on the history of the distance to the obstacle on the side of the vehicle according to the traveling distance for the predetermined amount of time or the predetermined traveling distance before the stop of the vehicle.

When the initial stop position is calculated, the controller 1 guides the driver to cause the vehicle to reach the initial stop position by advancing the vehicle straight forward or moving the vehicle straight backward via the speaker 6.

However, in a case where the initial stop position can not be calculated using only the history stored in the controller 1, the controller 1 further guides the driver to advance the vehicle straight forward or to move the vehicle straight backward via the speaker 6 and adds to the stored history a relationship between the traveling distance and the distance to the obstacle obtained during the above-mentioned operation, to thereby calculate the initial stop position. Thereafter, the controller 1 guides the driver to cause the vehicle to reach the initial stop position by advancing the vehicle straight forward or moving the vehicle straight backward via the speaker 6.

After the vehicle 10 stops in the initial stop position as described above, the controller 1 provides via the speaker 6 to the driver guiding information for causing the vehicle 10 to reach the steering wheel cutting position and further to reach the parking space, in the same manner as in Embodiment 3 or 4.

Note that, also in Embodiment 5, in the same manner as in Embodiments 2 to 4, it is possible to guide capability and incapability of the parking through measuring the length of the target parking space when the vehicle advances straight forward toward the initial stop position, and to warn interference with the obstacle such as the vehicle that is parked behind.

According to the above-mentioned Embodiment 5, by only stopping the vehicle 10 in any position and actuating the in-line mode switch 4, the appropriate initial stop position is calculated based on the past history, whereby a parking assisting device that is excellent in operability can be realized.

Embodiment 6

Figure 14:
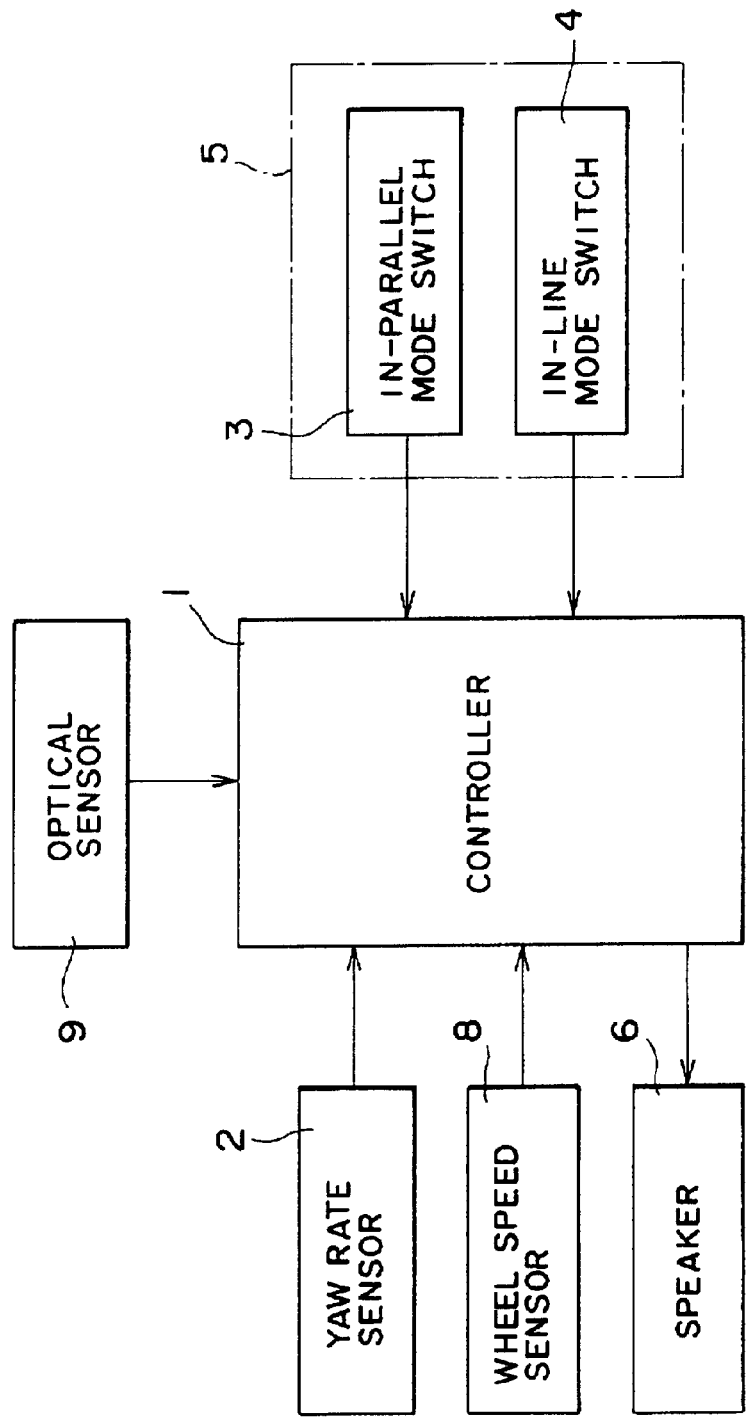
FIG. 14 is a block diagram showing a construction of a parking assisting device according to Embodiment 6.

FIG. 14 shows a parking assisting device according to Embodiment 6. The parking assisting device according to Embodiment 6 is, in the device of Embodiment 1 shown in FIG. 1, installed on a front end side portion of the vehicle with an optical sensor 9 as the first distance sensor instead of the ultrasonic sensor 7 for measuring a distance to the obstacle on the side of the vehicle.

According to Embodiment 6 described above, in the same manner as in Embodiments 1 to 5, it is possible to provide the driver appropriate timing for the temporal stop under the fully cut state of the steering wheel via the speaker 6 and complete in-line parking in the parking frame T.

Note that, also with the optical sensor 9, as in Embodiment 2, it is possible to measure the length of the parking space to utilize it for calculation of the turning angles $\alpha$, $\beta$ and $\delta$.

The optical sensor 9 can be constituted by a combination of light emitting means such as an LED or a laser diode and light receiving means such as a phototransistor or a CCD device. Further, a sensor utilizing an electromagnetic wave other than light such as a radar may also be used instead of the optical sensor 9.

Note that, in Embodiments 1 to 6 described above, it is possible to constitute the device so as to give a warning to the driver via the speaker 6 in a case where it is impossible to calculate the turning angle that is applicable to the parking operation due to a large deviation and in a case where interference of the vehicle 10 with the obstacle such as the parked vehicle 20 upon in-line parking is predicted when turning the vehicle 10 at the turning angle obtained based on the steering angle that is held at the maximum. In this manner, it is possible to prevent the vehicle 10 from interfering with the obstacle, according to the turning angle that is calculated by considering a positional deviation of the initial stop position.

Further, in Embodiments 1 to 6, the yaw rate sensor is used as yaw angle detecting means. However, the means for detecting the yaw angle may also include a method using a position gyroscope or a method for detecting the yaw angle from a difference in rotation obtained by rotation sensors that are mounted to left and right wheels, respectively. Further, a method using a terrestrial magnetism sensor or a GPS system may also be used.

Note that, in Embodiments 1 to 6 described above, the approach information and the arrival information may change volume and timbre of the sound emitted from the speaker 6, or may cause sound having different contents to be emitted, for every vehicle position that is the target of the approach and the arrival of the vehicle. In addition, the guiding means is not limited to the speaker 6 and may be a buzzer, an LED or a lamp, and characters or marks may also be displayed on a display. Further, vibration may also be used, which is transmitted to the driver via the steering wheel or the like.

As described above, according to the present invention, the first distance sensor measures the distance to the obstacle on the side of the vehicle and simultaneously the second distance sensor measures the moving distance of the vehicle at the time of the advancing operation of the vehicle until reaching the initial stop position, and the controller grasps the initial stop position based on those measured distances and provides to the driver via the guiding means the appropriate timing for the temporal stop for the back parking based on the initial stop position and the yaw angle detected by the yaw angle detecting means. As a result, it is possible to accurately guide the driver the driving operation upon parking without imposing a large burden on the driver even if the vehicle is not accurately stopped in the reference position for the initial stop set in advance.

Further, when the appropriate initial stop position is guided, the number of operations upon back parking is reduced, whereby the burden imposed on the driver can be further decreased.

What is claimed is:

1. A parking assisting device comprising:
    a first distance sensor for measuring a distance to an obstacle on a side of a vehicle;

a second distance sensor for measuring a moving distance of the vehicle;

yaw angle detecting means for detecting a yaw angle of the vehicle;

guiding means for outputting guiding information on a driving operation to a driver; and a controller for grasping an initial stop position based on the distance to the obstacle on the side of the vehicle measured by the first distance sensor and the moving distance of the vehicle measured by the second distance sensor at a time of an advancing operation of the vehicle until reaching the initial stop position, for calculating a track for back parking as two circular arcs having predetermined radii respectively which are circumscribed to each other based on the distance to the obstacle on the side of the vehicle measured by the first distance sensor, and for providing to the driver via the guiding means a steering wheel cutting position based on an angle corresponding to a point in which the two circular arcs are circumscribed and the yaw angle detected by the yaw angle detecting means.

2. A parking assisting device according to claim 1, wherein the controller calculates a suitable initial stop position based on the distance to the obstacle on the side of the vehicle measured by the first distance sensor and simultaneously guides via the guiding means the driver to an effect of stopping the vehicle when the controller judges that the vehicle has reached the initial stop position based on the moving distance of the vehicle measured by the second distance sensor.

3. A parking assisting device according to claim 2, wherein the controller provides via the guiding means to the driver guiding information of: moving the vehicle backward with the steering angle at the maximum from the initial stop position and stopping the vehicle at the steering wheel cutting position; and moving the vehicle backward with the steering angle at the maximum in the opposite direction from the steering wheel cutting position so as to cause the vehicle to reach the target parking space.

4. A parking assisting device according to claim 2, wherein the controller stores as a history the distance to the obstacle on the side of the vehicle measured by the first distance sensor and the moving distance of the vehicle measured by the second distance sensor and simultaneously calculates the suitable initial stop position based on this history.

5. A parking assisting device according to claim 1, wherein the controller measures a length of the target parking space based on the distance to the obstacle on the side of the vehicle measured by the first distance sensor and the moving distance of the vehicle measured by the second distance sensor at the time of the advancing operation of the vehicle until reaching the initial stop position.

6. A parking assisting device according to claim 1, wherein the first distance sensor is an ultrasonic sensor.

7. A parking assisting device according to claim 1, wherein the first distance sensor is a sensor using an electromagnetic wave.

8. A parking assisting device according to claim 1, wherein the second distance sensor is a wheel speed sensor.

9. A parking assisting device according to claim 1, wherein the yaw angle detecting mean is a yaw rate sensor.

10. A parking assisting device according to claim 1, wherein the guiding means is a speaker arranged in a driver seat.

11. A parking assisting device comprising:

a first distance sensor for measuring a distance to an obstacle on a side of a vehicle;

a second distance sensor for measuring a moving distance of the vehicle;

yaw angle detecting means for detecting a yaw angle of the vehicle;

guiding means for outputting guiding information on a driving operation to a driver; and a controller for measuring a deviation between an actual initial stop position and a reference position for an initial stop based on the distance to the obstacle on the side of the vehicle measured by the first distance sensor and the moving distance of the vehicle measured by the second distance sensor at a time of an advancing operation of the vehicle until reaching the initial stop position and for providing to the driver, via the guiding means, appropriate timing for a temporal stop for back parking based on the measured deviation and the yaw angle detected by the yaw angle detecting means.

12. A parking assisting device according to claim 11, wherein the controller guides via the guiding means the driver to an effect of stopping the vehicle when the controller judges that the vehicle has reached the initial stop position based on the distance to the obstacle on the side of the vehicle measured by the first distance sensor and the moving distance of the vehicle measured by the second distance sensor at the time of the advancing operation of the vehicle until reaching the initial stop position.

13. A parking assisting device according to claim 12, wherein the controller provides via the guiding means to the driver the guiding information of: advancing the vehicle with a steering angle at the maximum from the initial stop position and stopping the vehicle in a back start position; moving the vehicle backward with the steering angle at the maximum in an opposite direction from the back start position and stopping the vehicle in a steering wheel cutting position; and moving the vehicle backward with the steering angle at the maximum in the opposite direction again from the steering wheel cutting position so as to cause the vehicle to reach a target parking space.

14. A parking assisting device according to claim 11, wherein the controller calculates an inclination of the vehicle with respect to the target parking space based on the distance to the obstacle on the side of the vehicle measured by the first distance sensor and the moving distance of the vehicle measured by the second distance sensor at the time of the advancing operation of the vehicle until reaching the initial stop position, and adds this inclination to the deviation between the actual initial stop position and the reference position for the initial stop.

15. A parking assisting device comprising:

a first distance sensor for measuring a distance to an obstacle on a side of a vehicle;

a second distance sensor for measuring a moving distance of the vehicle;

yaw angle detecting means for detecting a yaw angle of the vehicle;

guiding means for outputting guiding information on a driving operation to a driver; and a controller for calculating the inclination of the vehicle with respect to a target parking space based on the distance to the obstacle on the side of the vehicle measured by the first distance sensor and the moving distance of the vehicle measured by the second distance sensor at a time of an advancing operation of the vehicle until reaching the initial stop position, for calculating a suitable initial stop position according to this inclination, and for providing to the driver via the guiding means appropriate timing for a temporal stop for back parking based on the initial stop position and the yaw angle detected by the yaw angle detecting means.

16. A parking assisting device comprising:

a first distance sensor for measuring a distance to an obstacle on a side of a vehicle;

a second distance sensor for measuring a moving distance of the vehicle;

yaw angle detecting means for detecting a yaw angle of the vehicle;

guiding means for outputting guiding information on a driving operation to a driver; and a controller for grasping a relationship among positions of the vehicle, the obstacle and a target parking space based on the distance to the obstacle on the side of the vehicle measured by the first distance sensor and the moving distance of the vehicle measured by the second distance sensor while the vehicle passes a side of the target parking space and for providing to the driver, via the guiding means, appropriate information on a driving operation based on an initial stop position and the yaw angle detected by the yaw angle detecting means, the controller storing as a history the distance to the obstacle on the side of the vehicle measured by the first distance sensor and the moving distance of the vehicle measured by the second distance sensor and emitting a warning to the driver in a case where interference of the vehicle with the obstacle, upon parking, is predicted based on the history.

* * * * *

UNITED STATES PATENT AND TRADEMARK OFFICE
CERTIFICATE OF CORRECTION

PATENT NO. : 6,898,527 B2
DATED : May 24, 2005
INVENTOR(S) : Kimura et al.

It is certified that error appears in the above-identified patent and that said Letters Patent is hereby corrected as shown below:

Column 15,
Line 61, please delete "mean" and insert therefore -- means --.

Signed and Sealed this

Twenty-seventh Day of September, 2005

JON W. DUDAS
*Director of the United States Patent and Trademark Office*